(12) United States Patent
Murakami et al.

(10) Patent No.: US 8,778,242 B2
(45) Date of Patent: Jul. 15, 2014

(54) HOUSING FOR FLUID DYNAMIC BEARING DEVICE

(75) Inventors: Kazutoyo Murakami, Kuwana (JP); Masaki Egami, Kuwana (JP); Kenji Ito, Kuwana (JP); Isao Komori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 212 days.

(21) Appl. No.: 13/361,503

(22) Filed: Jan. 30, 2012

(65) Prior Publication Data

US 2012/0126443 A1    May 24, 2012

Related U.S. Application Data

(62) Division of application No. 12/063,073, filed as application No. PCT/JP2006/307655 on Apr. 11, 2006, now abandoned.

(30) Foreign Application Priority Data

Sep. 6, 2005    (JP) .................................. 2005-257853

(51) Int. Cl.
*B29C 45/76*    (2006.01)
(52) U.S. Cl.
USPC ....................................................... 264/40.1
(58) Field of Classification Search
USPC ....................................................... 264/40.1
See application file for complete search history.

(56) References Cited

U.S. PATENT DOCUMENTS

| | | | |
|---|---|---|---|
| 4,652,149 A | 3/1987 | Nakaoka et al. | |
| 6,390,681 B1 | 5/2002 | Nakazeki et al. | |
| 7,023,116 B2 | 4/2006 | Kuribara | |
| 7,798,721 B2 | 9/2010 | Shibahara et al. | |
| 7,819,585 B2 | 10/2010 | Satoji et al. | |
| 2002/0191877 A1* | 12/2002 | Suzuki et al. | 384/488 |

(Continued)

FOREIGN PATENT DOCUMENTS

| | | |
|---|---|---|
| JP | 5-044716 A | 2/1993 |
| JP | 9-329146 A | 12/1997 |
| JP | 2003-314534 A | 11/2003 |
| WO | 2004-092600 A1 | 10/2004 |

OTHER PUBLICATIONS

Chinese Office Action dated Sep. 8, 2011, issued in corresponding Chinese Patent Application No. 2006-80027990.1.

(Continued)

*Primary Examiner* — Amjad Abraham
(74) *Attorney, Agent, or Firm* — Westerman, Hattori, Daniels & Adrian, LLP (57) ABSTRACT

Provided is a housing for a resin fluid dynamic bearing device in which deterioration with time of a fixing force for another member is mitigated and which can maintain a high bearing performance for a long period of time. The housing formed of a resin composition exhibiting a compression creep amount of 8% or less when a compressive pressure of 80 MPa is applied for 168 hours at an atmosphere temperature of 80° C., provides a sufficient fixing force for the another member fixed with a press-fitting force, for example, a bearing sleeve press-fitted into an inner periphery of the housing even after a long term use. Thus, there is no fear of fixing positions of the another member with respect to the housing being deviated and a high bearing performance is maintained for a long period of time.

5 Claims, 6 Drawing Sheets

(56) References Cited

U.S. PATENT DOCUMENTS

| | | |
|---|---|---|
| 2004/0017954 A1* | 1/2004 | Komori et al. ............... 384/100 |
| 2004/0258335 A1 | 12/2004 | Shimizu et al. |
| 2006/0045395 A1 | 3/2006 | Shimazu et al. |
| 2006/0188187 A1 | 8/2006 | Kurimura et al. |
| 2007/0025652 A1 | 2/2007 | Satoji et al. |
| 2009/0232430 A1 | 9/2009 | Ito |
| 2009/0324149 A1 | 12/2009 | Yamamoto et al. |
| 2010/0226601 A1 | 9/2010 | Inazuka et al. |
| 2010/0232733 A1 | 9/2010 | Ito et al. |

OTHER PUBLICATIONS

International Preliminary Report on Patentability (FormPCT/IB/373 of International Application No. PCT/JP2006/307655 date of issuance Sep. 9, 2008, with Form PCT/IDS/237.

International Search Report of PCT/JP2006/307655, date of mailing Jul. 18, 2006.

* cited by examiner

| Name | | Example, vol% | | | | | | Comparative Example, vol% | | | |
|---|---|---|---|---|---|---|---|---|---|---|---|
| | | 1 | 2 | 3 | 4 | 5 | 6 | 1 | 2 | 3 | 4 |
| Base resin | Linear type PPS | 70 | 60 | 50 | | | | 92 | 40 | 50 | |
| | Cross-link type PPS | | | | 60 | | | | | | |
| | PEEK | | | | | 75 | | | | | |
| | LCP | | | | | | 60 | | | | |
| | PA66 | | | | | | | | | | 60 |
| Carbon fiber (PAN type) | | 10 | 20 | 30 | 20 | 25 | 20 | 8 | 40 | | 20 |
| Glass fiber | | | | | | | | | | 30 | |
| Carbon black | | 5 | 5 | 5 | 5 | | 5 | | 5 | 5 | 5 |
| ALBOREX | | 15 | 15 | 15 | 15 | | 15 | | 15 | 15 | 15 |
| Composition total, vol% | | 100 | 100 | 100 | 100 | 100 | 100 | 100 | 100 | 100 | 100 |

FIG. 8

|  |  | Example | | | | | | Comparative Example | | | |
|---|---|---|---|---|---|---|---|---|---|---|---|
|  |  | 1 | 2 | 3 | 4 | 5 | 6 | 1 | 2 | 3 | 4 |
| (A) Creep resistance | Extraction force (prior to being left to stand) : $F_0$ | 26.1 | 29.1 | 30.9 | 29.2 | 33.1 | 30.2 | 21.2 | Molding impossible | 28.4 | 24.3 |
|  | Extraction force (after being left to stand) : F | 16.5 | 22.1 | 27.7 | 24.1 | 32.7 | 29.8 | 0.8 |  | 24.3 | 2.1 |
|  | Extraction force reduction ratio : D, % | 36.8 | 24.1 | 10.4 | 17.5 | 1.2 | 1.3 | 96.2 |  | 14.4 | 91.4 |
|  | Judgment | ○ | ○ | ○ | ○ | ○ | ○ | × | × | ○ | × |
| Compression creep amount : C, % | | 5.4 | 4.6 | 4.4 | 4.1 | 3.8 | 3.9 | 9.8 | (3.9) | 4.1 | 10.8 |
| (B) Conductivity (Volume resistivity, $\Omega \cdot m$) | | $8.1 \times 10^2$ | $7.2 \times 10^2$ | $1.8 \times 10^2$ | $7.4 \times 10^2$ | $5.0 \times 10^5$ | $3.7 \times 10^2$ | $5.0 \times 10^5$ | $9.0 \times 10^1$ | $1.0 \times 10^{16}$ | $6.3 \times 10^2$ |
| Judgment | | ○ | ○ | ○ | ○ | ○ | ○ | ○ | ○ | × | ○ |
| Overall judgment | | ○ | ○ | ○ | ○ | ○ | ○ | × | × | △ | × |

FIG. 9

HOUSING FOR FLUID DYNAMIC BEARING DEVICE

CROSS-REFERENCE TO RELATED APPLICATIONS

This application is a divisional of U.S. patent application Ser. No. 12/063,073, filed on Feb. 6, 2008, which in turn is a U.S. national stage application of international application No. PCT/JP2006/307655, filed on Apr. 11, 2006, and which claims priority of Japanese patent application No. 2005-257853, filed on Sep. 6, 2005, the entirety of which is incorporated herein by reference.

BACKGROUND OF THE INVENTION

The present invention relates to a housing for a fluid dynamic bearing device. The fluid dynamic bearing device having this housing is suitable for use in a spindle motor of an information apparatus, for example, a magnetic disk apparatus, such as an HDD or an FDD, an optical disk apparatus, such as a CD-ROM, a CD-R/RW, or a DVD-ROWM, or a magneto-optical disk apparatus, such as an MD or an MO, a polygon scanner motor of a laser beam printer (LBP), a color wheel of a projector, or a small motor of an electric apparatus, such as an axial flow fan.

Apart from high rotational accuracy, an improvement in speed, a reduction in cost, a reduction in noise, etc. are required of the motors described above. One of factors determining such requisite performances is a bearing supporting a spindle of the motor. In recent years, as such the bearing, use of a fluid dynamic bearing superior in the above requite performances is being considered, or such the fluid dynamic bearing has been actually put into practical use.

The fluid dynamic bearings of this type can be roughly classified into dynamic pressure bearings equipped with a dynamic pressure generating portion for generating a dynamic pressure in a lubricating fluid in a bearing gap, and so-called cylindrical bearings equipped with no dynamic pressure generating portion (bearings whose sectional configuration is circular).

The above-mentioned fluid dynamic bearing device is composed of components, such as a housing, a bearing sleeve, and a shaft member. As information apparatuses are improved in terms of performance, efforts are being made to enhance dimensional precision and assembly precision of their components in order to secure a high rotational performance as required. On the other hand, due to tendency of information apparatuses to be reduced in price, there is an increasingly strict demand for a reduction in the cost of fluid dynamic bearing devices of this type. Nowadays, to meet this demand, as disclosed in JP 2003-314534 A, some fluid dynamic bearing devices have housings, which are constituent components thereof, formed of resin materials.

For the method of fixing another member such as a bearing sleeve or a seal member, to an inner periphery of such the resin housing, it is desirable to be the method involving a press-fitting force, such as press-fitting or press-fitting/adhesion (press-fitting through the intermediation of an adhesive), taking into account the fixing force and temporary positioning. However, as compared with a metal housing, the resin housing is inferior in creep resistance, so the press-fitting force, that is, the fixing force for the another member, undergoes a considerable deterioration with time. Thus, when an excessive load, such as drop impact, is applied to the bearing device, there is a fear of problems, such as deviation of fixing positions of the another member with respect to the housing and a deterioration in bearing performance

SUMMARY OF THE INVENTION

In view of this, it is an object of the present invention to provide a resin housing for a fluid dynamic bearing device in which deterioration with time of a fixing force for another member is mitigated and which can maintain a high bearing performance for a long period of time.

To achieve the above object, the housing for the fluid dynamic bearing device according to the present invention is fixed to another member with a press-fitting force, and is characterized in that: at least a portion of the housing for the fluid dynamic bearing device, held in contact with the another member with the press-fitting force is formed of a resin composition; and the resin composition exhibits a compression creep amount of 8% or less when a compressive pressure of 80 MPa is applied thereto for 168 hours at an atmosphere temperature of 80° C.

An examination conducted by the present inventors has shown that a housing formed of a resin composition exhibiting a compression creep amount of 8% or less when a compressive pressure of 80 MPa is applied for 168 hours at an atmosphere temperature of 80° C., provides a sufficient fixing force for the another member fixed with a press-fitting force even after a long term use (e.g., for a period corresponding to a service life of the product). Thus, when the housing is formed of a resin composition satisfying the above conditions, the requisite fixing force for the another member with respect to the housing is guaranteed, so there is no fear of fixing positions of the another member being deviated and a high bearing performance is maintained.

For example, in the case of a fluid dynamic bearing device to be incorporated into the spindle motor of a disk drive apparatus, such as an HDD, when the housing is formed of a resin, the disk hub, etc. are charged with static electricity generated through friction between a disk and air since a resin is generally an insulating material. Thus, a difference in electrical potential is generated between a magnetic disk and a magnetic head, and there is a fear of peripheral apparatuses being damaged through discharge of static electricity. When a volume resistivity of a resin composition forming the housing is set to $10^7$ Ω-cm or less, a conductivity of the housing is secured, so it is possible to prevent charging with static electricity.

A crystalline resin is superior in wear resistance, oil resistance, low out-gas property, low water absorption property, and heat resistance, so it is suitable as a base resin for the housing for a fluid dynamic bearing device. Above all, polyphenylene sulfide (PPS) is particularly preferable since it is a resin available at low cost and superior in fluidity at the time of molding (melting viscosity).

In a fluid dynamic bearing device equipped with the housing as described above, a bearing sleeve fixed to an inner periphery of the housing, and a shaft, a deterioration with time in the fixing force for the housing and the bearing sleeve is suppressed, making it possible to maintain a high bearing performance for long period of time.

A motor having a fluid dynamic bearing device as described above, a rotor magnet, and a stator coil can be used for a long period of time.

In accordance with the present invention, the housing for the fluid dynamic bearing device is formed of a resin composition superior in creep resistance, whereby a deterioration with time in the fixing force for the another member, such as the bearing sleeve, can be suppressed. Thus, even after a long-term use, the fixing positions of the another member with respect to the housing are not deviated, making it possible to prevent a deterioration in bearing rigidity and in the rotational performance of the bearing.

DESCRIPTION OF THE PREFERRED EMBODIMENTS

In the following, the first embodiment of the present invention will be described with reference to FIGS. 1 through 4.

Figure 1:
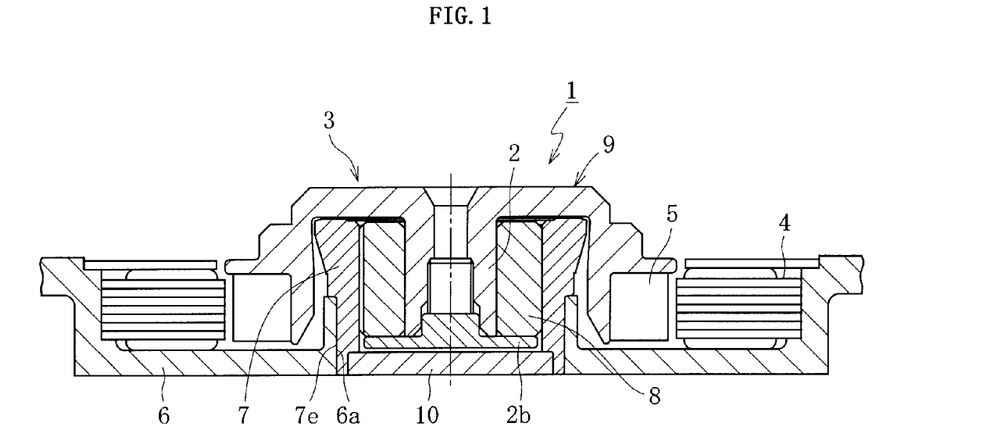
FIG. 1 is a sectional view of a spindle motor into which a fluid dynamic bearing device according to a first embodiment of the present invention is incorporated.

FIG. 1 is a diagram conceptually showing a construction example of an information apparatus spindle motor into which a fluid dynamic bearing device 1 according to the first embodiment of the present invention is incorporated. This spindle motor is used in a disk drive apparatus, such as an HDD, and is equipped with: the fluid dynamic bearing device 1 which rotatably supports a rotary member 3 equipped with a shaft 2 in a non-contact fashion; a stator coil 4 and a rotor magnet 5 opposed to each other through the intermediation, for example, of a radial gap; and a motor bracket 6. The stator coil 4 is mounted to the outer side of motor bracket (stationary member) 6, and the rotor magnet 5 is mounted to the outer periphery of the rotary member 3. A housing 7 of the fluid dynamic bearing device 1 is fixed to the inner periphery of the motor bracket 6. Although not shown, one or a plurality of disk-shaped information recording media, such as magnetic disks (hereinafter simply referred to as disks) are retained by the rotary member 3. In the spindle motor constructed as described above, when electricity is supplied to the stator coil 4, the rotor magnet 5 is rotated by an electromagnetic force generated between the stator coil 4 and the rotor magnet 5, and with this rotation, the rotary member 3 and the disks retained by the rotary member 3 are rotated integrally with the shaft 2.

Figure 2:
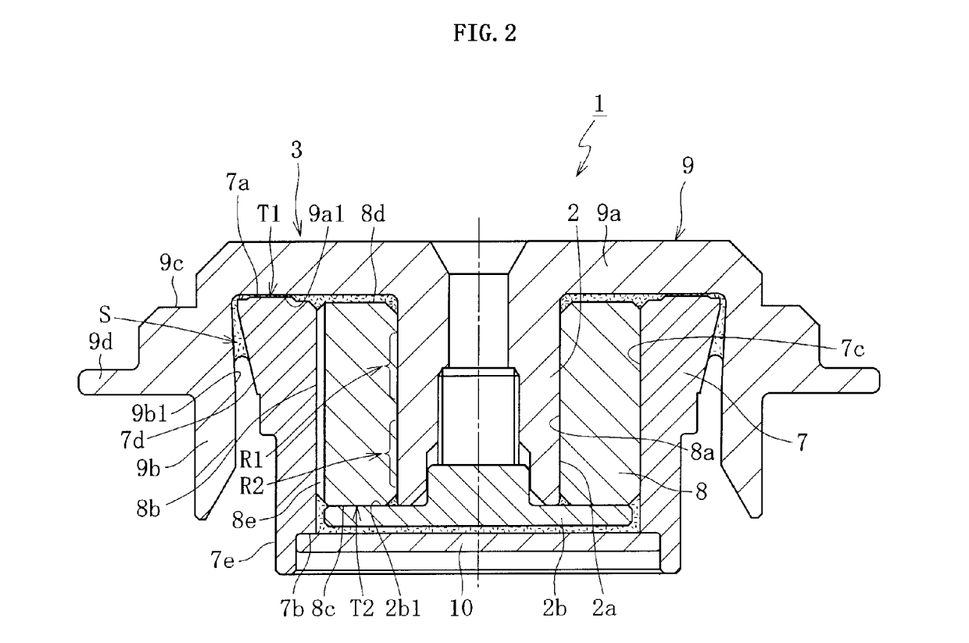
FIG. 2 is a sectional view of the fluid dynamic bearing device.
Figure 3:
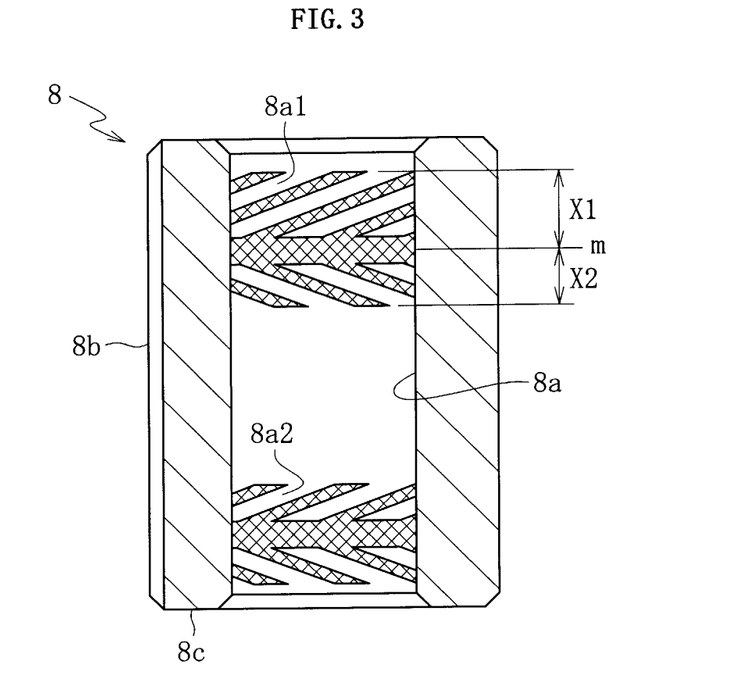
FIG. 3 is a sectional view of a bearing sleeve.
Figure 4:
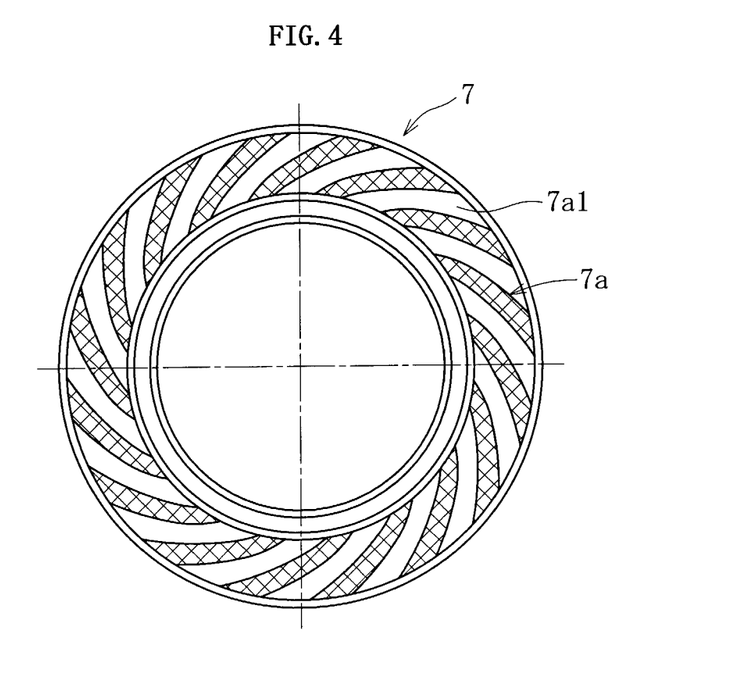
FIG. 4 is a plane view of an upper end surface of a housing.

FIG. 2 shows the fluid dynamic bearing device 1. The fluid dynamic bearing device 1 is mainly equipped with the housing 7, a bearing sleeve 8 fixed to the housing 7, and the rotary member 3 adapted to make a relative rotation with respect to the housing 7 and the bearing sleeve 8. For the sake of convenience in illustration, of the openings formed at both axial ends of the housing 7, the one closed by a cover member 10 will be referred to as a lower opening, and the one on the opposite side thereto will be referred to as an upper opening.

The rotary member 3 is equipped with a hub portion 9 arranged, for example, on the open side of the housing 7, and the shaft 2 inserted into the inner periphery of the bearing sleeve 8.

The hub portion 9 is formed of a metal material or a resin material, and is composed of a disc portion 9a covering the opening side (upper side) of the housing 7, a cylindrical portion 9b extending axially downwards from the outer peripheral portion of the disc portion 9a, a disk mounting surface 9c provided in the outer periphery of the cylindrical portion 9b, and a flange portion 9d. A disk (not shown) is fitted onto the outer periphery of the disc portion 9a, and placed on the disk mounting surface 9c. Then, the disk is retained on the hub portion 9 by an appropriate retaining device (such as a clamper) (not shown).

In this embodiment, the shaft 2 is formed integrally with the hub portion 9, and has, at its lower end, a separate flange portion 2b serving as a detachment preventing device. The flange portion 2b is formed of metal, and is fixed to the shaft 2 by a connecting device, such as a screw.

The bearing sleeve 8 may be formed of a metal material, such as a copper alloy like brass, or an aluminum alloy. Alternatively, it may be formed of a porous material composed of a sintered metal. In this embodiment, it is formed as a cylinder of a porous material composed of a sintered metal whose main component is copper.

All over the inner peripheral surface 8a of the bearing sleeve 8 or in a partial cylindrical region thereof, there is formed a region in which a plurality of dynamic pressure grooves are arranged as radial dynamic pressure generating portions. As shown, for example, in FIG. 3, in this embodiment, there are formed two axially separated regions in which a plurality of dynamic pressure grooves 8a1 and 8a2 are arranged in a herringbone-like configuration. These regions where the dynamic pressure grooves are formed are opposed to the outer peripheral surface 2a of the shaft 2 as radial bearing surfaces, and during rotation of the rotary member 3, form the radial bearing gaps of first and second radial bearing portions R1 and R2 between themselves and the outer peripheral surface 2a of the shaft 2 (see FIG. 2).

Although not shown, all over the lower end surface 8c of the bearing sleeve 8 or in a partial annular region thereof, there is formed a region in which a plurality of dynamic pressure grooves are arranged, for example, in a spiral configuration as thrust dynamic pressure generating portions. The region where these dynamic pressure grooves are formed is opposed to the upper end surface 2b1 of the flange portion 2b as the thrust bearing surface, and forms, during rotation of the rotary member 3, the thrust bearing gap of a second thrust bearing portion T2 between itself and the upper end surface 2b1 (see FIG. 2).

The housing 7 is formed in a cylindrical configuration of a resin material. In this embodiment, the housing 7 is open at both axial ends thereof, and the lower end thereof is closed by the cover member 10. All over or in a partial annular region of the upper end surface, there is provided a thrust bearing surface 7a. In this embodiment, there is formed in the thrust bearing surface 7a a region in which, as shown, for example, in FIG. 4, a plurality of dynamic pressure grooves 7a1 are arranged in a spiral configuration as thrust dynamic pressure generating portions. The thrust bearing surface 7a (the dynamic pressure groove 7a1 formation region) is opposed to a lower end surface 9a1 of the disc portion 9a of the hub portion 9, and forms, during rotation of the rotary member 3, the thrust bearing gap of a first thrust bearing portion T1 described below between itself and the lower end surface 9a1 (see FIG. 2).

The cover member 10 closing the other end of the housing 7 is formed of a metal material or a resin material, and is fixed to a step portion 7b formed in the inner periphery of the other end of the housing 7. Here, there are no particular limitations regarding the fixing method. For example, it is possible to select as appropriate a method, such as adhesion (including loose adhesion and press-fitting adhesion), press-fitting, fusion-bonding (e.g., ultrasonic fusion-bonding), or a welding (e.g., laser welding) according to the combination of materials and the requisite assembly strength, sealing property, etc.

The outer peripheral surface 8b of the bearing sleeve 8 is fixed to the inner peripheral surface 7c of the housing 7 with a method involving a press-fitting force, such as press-fitting or press-fitting adhesion.

In the outer periphery of the housing 7, there is formed a tapered seal surface 7d gradually diverging upwardly. The tapered seal surface 7d forms between itself and an inner peripheral surface 9b1 of the cylindrical portion 9b an annular seal space S whose radial dimension is gradually diminished from the closed side (the lower side) toward the open side (the upper side) of the housing 7. During rotation of the shaft 2 and the hub portion 9, the seal space S communicates with the outer side of the thrust bearing gap of the first thrust bearing portion T1.

At the lower end of the outer periphery of the housing 7, there is formed an adhesion fixation surface 7e. In this embodiment, the adhesion fixation surface 7e has a cylindrical configuration with a fixed diameter, and is fixed to the inner peripheral surface 6a of the motor bracket 6 by a method, such as adhesion or press-fitting adhesion. As a result, the fluid dynamic bearing device 1 is incorporated into the motor.

The interior of the fluid dynamic bearing device 1 is filled with a lubricating oil, and the oil level of the lubricating oil is constantly maintained within the seal space S. Various oils can be used as the lubricating oil. In particular, the lubricating oil used in a fluid dynamic bearing device for a disk drive apparatus, such as an HDD, is required to have low evaporation rate and low viscosity, and an ester type lubricating oil, such as dioctyl sebacate (DOS) or dioctyl azelate (DOZ), is preferable.

As stated above, the outer peripheral surface 8b of the bearing sleeve 8 is fixed with a press-fitting force to the inner peripheral surface 7c of the housing 7 formed of a resin material. This press-fitting force is reduced with time due to the creep characteristic of a resin composition as the resin material. When the resin composition forming the housing 7 is inferior in creep resistance, the fixing force with which the housing 7 and the bearing sleeve 8 are fixed together is reduced with time to a larger degree. When, as the resin composition forming the housing 7, there is selected one which exhibits a compression creep amount of 8% or less when a compressive pressure of 80 MPa is applied for 168 hours at an atmosphere temperature of 80° C., it is possible to obtain a housing 7 which exhibits a sufficient fixing force with respect to the bearing sleeve 8 even after a long term use (e.g., for a period corresponding to the product service life).

When the housing 7 is superior in creep resistance, it is possible to suppress a deterioration in fixing force with time not only in the case of the fixing force with respect to the bearing sleeve 8, but also, for example, in a case in which the cover member 10 and the motor bracket 6 are fixed to the housing 7 with a press-fitting force.

The thrust bearing surface 7a at the upper end surface of the housing 7 is opposed to the lower end surface 9a1 of the disc portion 9a of the hub portion 9 through the intermediation of the thrust bearing gap, so that, at the start, stopping, etc. of the motor, wear of the sliding surfaces due to contact sliding of the surfaces opposed to each other through the intermediation of the bearing gap is inevitable. In particular, in the portion where the dynamic pressure grooves are formed, the depth of the dynamic pressure grooves is as small as 10 μm or less, so that, when the wear progresses, there is a fear of the supporting force of the bearing ceasing to be generated. Thus, it is necessary to select a resin material (a resin composition) of high wear resistance for the housing 7.

Further, a resin composition of the housing 7 is required to have oil resistance with respect to the lubricating oil. Apart from this, it is necessary to suppress the out-gas generation amount and the water absorption amount during use. Further, taking into account the temperature change in the atmosphere of use, a high level of heat resistance is also required.

As a base resin of the resin composition forming the housing 7, a crystalline resin (PPS, LCP, PEEK or the like) satisfies the above conditions (high wear resistance, high oil resistance, low out-gas property, low water absorption, and high heat resistance). Above all, PPS is available at lower cost as compared with the other crystalline resins, and is a resin superior in the fluidity (melting viscosity) at the time of molding, so that it is particularly suitable as the base resin for the housing 7.

Generally speaking, polyphenylene sulfide (PPS) is produced by condensation polymerization reaction of sodium sulfide and paradichlorobenzene. At the same time, it contains sodium chloride as a by-product. Thus, it is necessary to clean the polyphenylene sulfide (PPS) by using an appropriate solvent. For the cleaning, any solvent will do as long as it exhibits a dielectric constant of at least 10, more preferably 20 or more, and most preferably 50 or more. Further, from the environmental point of view, a preferable solvent may, for example, be water (with a dielectric constant of approximately 80), in particular, ultrapure water. Through cleaning with such a solvent, mainly the Na of the polyphenylene sulfide (PPS) terminal groups is removed, so that it is possible to reduce the Na content of the polyphenylene sulfide (PPS) (to a level, for example, of 2000 ppm or less), making it possible to use it as the resin material forming the housing 7. Further, by removing the Na of the terminal groups, the crystallization rate is advantageously increased.

According to structure, PPS are roughly classified into cross-link type PPS, semi-linear type PPS, and linear type PPS. Any type of PPS can be used as the base resin of the resin composition for the hub portion 9 as long as it has an Na content of 2000 ppm or less, more preferably 1000 ppm or less, and most preferably, 500 ppm or less. Above all, many linear type PPS satisfy this condition. By using a resin composition satisfying this condition, it is possible to suppress the amount of Na ions eluted into the lubricating oil, and to more reliably prevent precipitation of Na on the surface of the fluid dynamic bearing device 1, the disk retained by the rotary member 3, or the disk head (not shown).

The above resin material can be mixed with carbon fiber as a filler. This helps to enhance the strength of the housing 7, and to suppress a change in dimension with a change in the temperature of the housing 7, making it possible to attain high dimensional stability. As a result, it is possible to control the thrust bearing gap during use with high accuracy. Further, by mixing the base resin with carbon fibers, the high conductivity of carbon fibers manifests itself, making it possible to impart a sufficient conductivity (for example, $10^7$ Ω-cm or less in volume resistivity) to the housing 7. As a result, it is possible to dissipate the static electricity with which the disk is charged during use to the ground side members (the motor bracket 6, etc.) through the rotary member 3 and the housing 7 (in some cases, via the bearing sleeve 8 also).

It is possible to use various types of carbon fibers, such as PAN type, Pich type, and vapor phase synthesis type ones.

From the viewpoint of reinforcing effect, ones with a relatively high tensile strength (preferably 3000 MPa or more) are preferable. In particular, as carbon fibers endowed with high conductivity, PAN type carbon fibers are preferable.

As the PAN type carbon fibers, it is possible to use ones in the following dimensional range.

(1) When a molten resin is kneaded for injection molding, the carbon fibers are cut to become short fibers. When this reduction in length progresses, the strength, conductivity, etc. are deteriorated to a marked degree, making it difficult to satisfy the required characteristics. Thus, allowing for the fiber bending at the time of molding, relatively long fibers are preferably used as the carbon fibers to be mixed with the resin. To be more specific, use of carbon fibers whose average fiber length is 100 μm or more (more preferably 1 mm or more) is preferable.

(2) On the other hand, in an injection molding process, the resin cured in the mold may be extracted, and melted again to be kneaded with a virgin resin composition for re-use (recycling). In this case, a part of the fibers are repeatedly recycled, so that, when the initial length of the fibers in the resin is too large, the fiber length is markedly reduced as compared with the initial fiber length due to the cutting during recycling, resulting in a marked change in the characteristics of the resin composition (e.g., a reduction in melting viscosity). In particular, a reduction in melting viscosity is a serious change since it affects the dimensional precision. To minimize such a change in characteristics, it is desirable for the fiber length to be relatively short. To be more specific, the average fiber length is preferably set to be 500 μm or less (more preferably, 300 μm or less).

The selection of the fiber length of the carbon fibers as mentioned above can be made based on the record of the resin composition used in the actual injection molding process. For example, when a virgin resin composition is used alone, or when a virgin resin composition is mixed with a recycled resin composition, with the proportion of the virgin resin composition being large, it is desirable to use carbon fibers in the dimensional range as mentioned in the above item (1) from the viewpoint of suppressing a deterioration in strength, conductivity, etc., and since it allows a reduction in the mixing amount of carbon fibers. Conversely, when the proportion of the recycled resin composition is large, it is desirable to use carbon fibers in the dimensional range as mentioned in the above item (2) from the viewpoint of suppressing the change in the characteristics of the resin composition due to the recycling.

In carbon fibers of both of the categories (1) and (2), the smaller the diameter of the carbon fibers, the larger the number of carbon fibers mixed, which is effective in achieving uniformalization in product quality. Further, the larger their aspect ratio, the more enhanced is the reinforcing effect of the fibers. Thus, the larger the aspect ratio of the carbon fibers, the more desirable it is. To be more specific, an aspect ratio of 6.5 or more is preferable. Taking into account the operability and availability, an appropriate average fiber diameter ranges from 5 to 20 μm.

In order that the reinforcing effect, the static electricity removing effect, etc. due to the carbon fibers may be exerted to a sufficient degree, the mixing amount of the carbon fibers with respect to the base resin ranges from 10 to 35 vol %, and more preferably ranges from 15 to 25~01%. If the mixing amount of the carbon fibers is less than 10 vol %, the reinforcing effect and the static electricity removing effect of the carbon fibers cannot be exerted to a sufficient degree. Further, it is impossible to secure the wear resistance of the portion of the housing 7 sliding on another member, in particular, the wear resistance of the member on which it slides. If the mixing amount of the carbon fibers exceeds 35 vol %, the moldability of the housing 7 deteriorates, making it difficult to attain high dimensional precision.

To fill the cavity with molten resin with high accuracy, the melting viscosity of the resin composition obtained by mixing carbon fibers with the base resin is preferably kept at 500 Paes or less at the resin temperature at the time of injection molding and at a shearing rate of 1000 s-'. Thus, also from the viewpoint of compensating for the increase in viscosity due to the filling of various fillers such as carbon fibers, the melting viscosity of the base resin is preferably 300 Pa-s or less under the above conditions.

As described above, by forming the housing 7 of the resin composition as mentioned above, it is possible to form a housing 7 endowed with a superior creep resistance, high oil resistance, low out-gas property, high fluidity at the time of molding, low water absorption, and high heat resistance. As a result, it is possible to enhance the long-term durability and reliability of the fluid dynamic bearing device 1 and of the disk drive apparatus into which this bearing device is incorporated. Further, by mixing an appropriate amount of carbon fibers according to the use, it is possible to obtain a housing 7 which is also superior in mechanical strength, impact resistance, moldability, dimensional stability, and static electricity removal property.

In the fluid dynamic bearing device 1, constructed as described above, during rotation of the shaft 2 (the rotary member 3), the regions of the inner peripheral surface 8a of the bearing sleeve 8 constituting the radial bearing surfaces (the upper and lower regions where the dynamic pressure grooves 8a1 and 8a2 are formed) are opposed to the outer peripheral surface 2a of the shaft 2 through the intermediation of the radial bearing gap. As the shaft 2 rotates, the lubricating oil in the radial bearing gap is forced in toward the axial centers of the dynamic pressure grooves 8a1 and 8a2, with the result that the pressure thereof increases. Due to this dynamic pressure action of the dynamic pressure grooves 8a1 and 8a2, there are respectively formed a first radial bearing portion R1 and a second radial bearing portion R2 supporting the shaft 2 radially in a non-contact fashion.

At the same time, due to the dynamic pressure action of the dynamic pressure grooves, lubricating oil films are respectively formed in the thrust bearing gap between the thrust bearing surface 7a (the dynamic pressure groove 7a1 formation region) of the housing 7 and the lower end surface 9a1 of the disc portion 9a of the hub portion 9 opposed thereto, and in the thrust bearing gap between the lower end surface 8c (dynamic pressure groove formation region) of the bearing sleeve 8 and the upper end surface 2b1 of the flange portion 2b opposed thereto. Due to the pressure of these oil films, there are respectively formed a first thrust bearing portion T1 and a second thrust bearing portion T2 supporting the rotary member 3 in the thrust direction in a non-contact fashion.

In the present invention, the gap (first gap) between the inner peripheral surface 8a of the bearing sleeve 8 and the outer peripheral surface 2a of the shaft 2, the gap (second gap) between the lower end surface 8c of the bearing sleeve 8 and the upper end surface 2b1 of the flange portion 2b, the gap (third gap) between the upper end surface 8d of the bearing sleeve 8 and the lower end surface 9a1 of the disc portion 9a of the hub portion 9, and a circulation gap 8e, are respectively filled with the lubricating oil. In this connection, by circulating the lubricating oil such that it successively passes these gaps (including the circulation groove 8e), it is possible to prevent loss of pressure balance in each gap and prevent generation of negative pressure. In the construction example shown in FIG. 3, in the dynamic pressure grooves 8a1 constituting the dynamic pressure generating portions of the first radial bearing portion R1 serving as a device for generating such a circulation flow, the axial dimension X1 of the upper region is made larger than the axial dimension X2 of the lower region, thereby providing a difference in pumping force between the upper region and the lower region. In this case, it is possible to cause the lubricating oil to circulate in the following order: the first gap, the second gap, the circulation groove 8e, and the third gap. The circulating direction for the lubricating oil may be reversed. Further, if there is no particular need for it, it is not always necessary to provide a difference in pumping force between the dynamic pressure grooves of the upper and lower regions.

The above description of the first embodiment of the present invention should not be construed restrictively.

While in the first embodiment described above carbon fibers are mixed into one kind of base resin (polyphenylene sulfide) to obtain the resin composition forming the housing 7, as long as it does not interfere with the effect of the present invention, it is also possible to add an organic substance, such as another crystalline resin or amorphous resin, or a rubber component, and it is also possible to add, in addition to the carbon fibers, an inorganic substance, such as metal fibers, glass fibers, or whiskers. For example, it is possible to mix polytetrafluoroethylene (PTFE) as a releasing agent superior in oil resistance, and carbon black as an electrical conductivity imparting agent.

Further, while in the first embodiment described above, the thrust bearing surface 7a in which a plurality of dynamic pressure grooves 7a1 are arranged (the thrust bearing portion T1) is provided at the upper end surface of the housing 7, and the thrust bearing surface in which a plurality of dynamic pressure grooves (the thrust bearing portion T2) is provided at the lower end surface 8c of the bearing sleeve 8, the present invention is also applicable to a fluid dynamic bearing device in which solely the thrust bearing portion T1 is provided. In this case, the shaft 2 has no flange portion 2b, and exhibits a straight configuration. Thus, the housing 7 can be formed as a bottomed cylinder by forming it integrally of a resin material, using the cover member 10 as the bottom portion. Further, the shaft 2 and the hub portion 9 can be formed integrally of metal or resin, or the shaft 2 and the hub portion 9 can be formed as separate components. In this case, the shaft 2 is formed of metal, and it is also possible to mold the rotary member 3 integrally with the hub portion 9, using the metal shaft 2 as the insert part.

Figure 5:
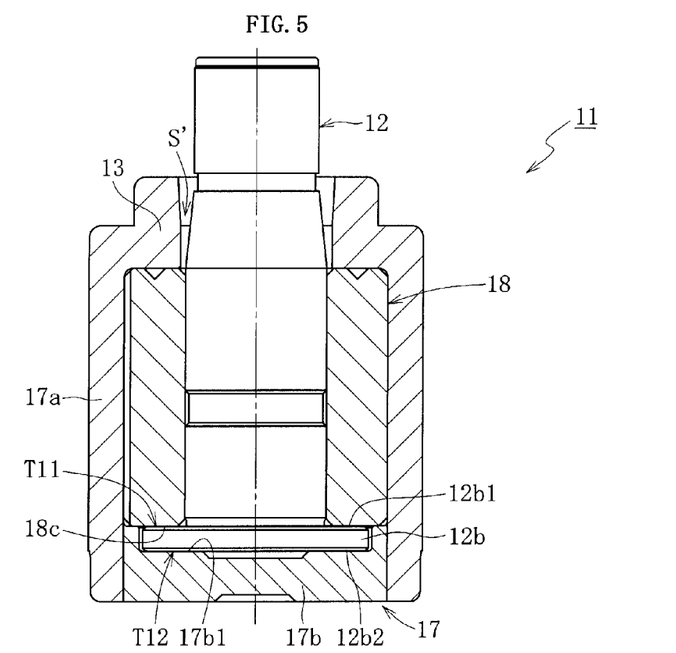
FIG. 5 is a sectional view of a fluid dynamic bearing device according to a second embodiment of the present invention.

FIG. 5 shows a fluid dynamic bearing device 11 according to the second embodiment of the present invention. In this embodiment, a shaft member (rotary member) 12 has at its lower end a flange portion 12b provided integrally or separately. A housing 17 is provided with a cylindrical side portion 17a, and a bottom portion 17b separate from the side portion 17a and situated at the lower end of the side portion 17a. At the upper end of the side portion 17a of the housing 17, a seal portion 13 protruding toward the inner periphery is formed integrally with the housing 17. The inner peripheral surface of the seal portion 13 forms a seal space S' between itself and the outer peripheral surface of the shaft member 12. Although not shown, in the upper end surface 17b1 of the bottom portion 17b of the housing 17, there is formed a region in which a plurality of dynamic pressure grooves are arranged, for example, in a spiral fashion, and also in a lower end surface 18c of a bearing sleeve 18, there is formed a region where dynamic pressure grooves are arranged in a similar configuration. Between the lower end surface 18c of the bearing sleeve 18 and the upper end surface 12b1 of the flange portion 12b of the shaft member 12, there is formed a first thrust bearing portion T11, and between the upper end surface 17b1 of the bottom portion 17b of the housing 17 and the lower end surface 12b2 of the flange portion 12b, there is formed a second thrust bearing portion T12.

In this embodiment, the side portion 17a of the housing 17 is formed of a resin material, along with the seal portion 13. Thus, when, as in the first embodiment, the side portion 17a of the housing 17 is formed of a resin composition superior in creep resistance, it is possible to guarantee, for a long period of time, the requisite fixing force with which the housing 17 is fixed to the bearing sleeve 18. Further, when the fixation of the bottom portion 17b and the side portion 17a of the housing 17 involves a press-fitting force, a similar effect is to be obtained.

Figure 6:
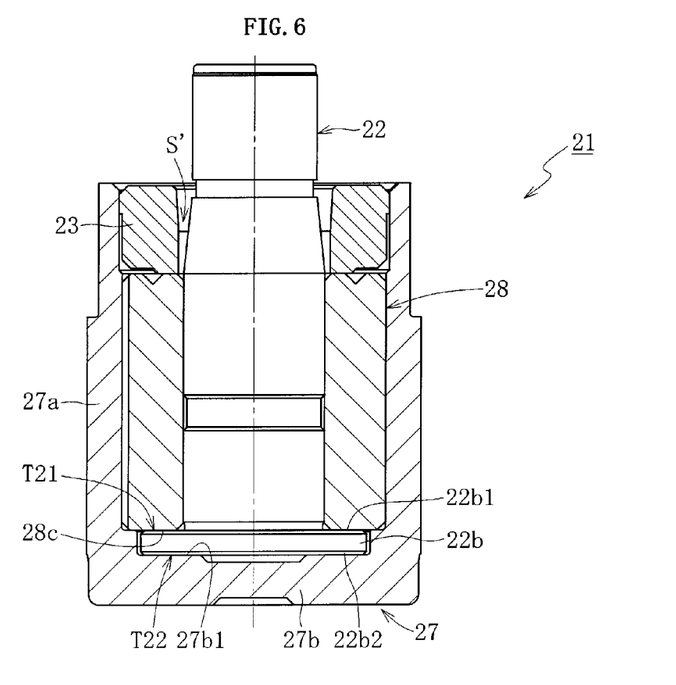
FIG. 6 is a sectional view of a fluid dynamic bearing device according to a third embodiment of the present invention.

FIG. 6 shows a fluid dynamic bearing device 21 according to a third embodiment of the present invention. In this embodiment, a seal member 23 is formed as a component separate from a side portion 27a of a housing 27, and is fixed to an inner periphery of an upper end portion of the housing 27 by adhesion, pressing, fusion-bonding, etc. A bottom portion 27b of the housing 27 is molded of a resin material integrally with the side portion 27a of the housing 27, and is formed as a bottomed cylinder. Otherwise, this embodiment is of the same construction as the second embodiment, so a further description thereof will be omitted.

In this embodiment also, when the housing 27 is formed of a resin composition superior in creep resistance as in the first embodiment, the required fixing force for the housing 27 and the bearing sleeve 28 is guaranteed for a long period of time. Further, when the fixation of the seal member 23 and the housing 27 involves a press-fitting force, a similar effect is to be obtained.

While in the above embodiments (first through third embodiments) dynamic pressure grooves of a herringbone-like or a spiral configuration are adopted as the radial dynamic pressure generating portion and the thrust dynamic pressure generating portion, the present invention is not restricted to the adoption of these dynamic pressure grooves.

For example, although not shown, as the radial dynamic pressure generating portion, it is also possible to adopt a so-called step-like dynamic pressure generating portion, in which a plurality of axial grooves are formed circumferentially, or a so-called multi-arc bearing, in which a plurality of arcuate surfaces are arranged circumferentially, forming wedge-like radial gaps (bearing gaps) between themselves and the outer peripheral surface 2a of the opposing shaft 2 (or the shaft member 12,22).

Alternatively, it is also possible to form the inner peripheral surface 8a of the bearing sleeve 8 constituting the radial bearing surface as a cylindrical inner peripheral surface provided with no dynamic pressure grooves, arcuate surfaces, etc. as dynamic pressure generating portions, forming a so-called cylindrical bearing between this inner peripheral surface and the cylindrical outer peripheral surface 2a of the shaft 2 opposing thereto.

Further, it is also possible to form, as the thrust dynamic pressure generating portion, a so-called step bearing, a corrugated bearing (with a corrugated step form) or the like in which a plurality of dynamic pressure grooves in the form of radial grooves are provided at predetermined circumferential intervals.

Further, while in the above embodiments described above the radial dynamic pressure generating portions and the thrust dynamic pressure generating portions are formed on the stationary member side, the bearing surfaces where such dynamic pressure generating portions are formed may also be provided on the rotary member side opposed thereto.

Figure 7:
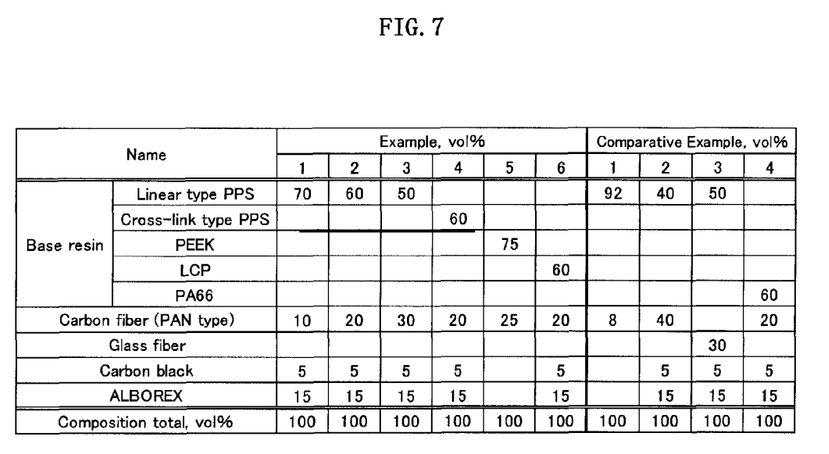
FIG. 7 is a table showing material compositions of examples and comparative examples.

To clarify the usefulness of the present invention, (A) evaluation in creep resistance and (B) evaluation in conductivity were performed on a plurality of resin compositions of different compositions. FIG. 7 shows the compositions and compounding ratios of the resin materials.

The materials used as the resin compositions for this evaluation test are as follows:

(i) Base Resin and Melting Viscosity (Measurement Temperature, Shearing Rate, Melting Viscosity)

Linear-type polyphenylene sulfide (PPS): manufactured by Dainippon Ink and Chemicals, Incorporated; grade, LC-5G (310° C., $10^3$ s$^{-1}$, 280 Pa·s)

Cross-link type PPS: manufactured by Dainippon Ink and Chemicals, Incorporated; grade, T-4 (310° C., $10^3$ s$^{-1}$, 100 Pa·s)

Polyetheretherketone (PEEK): manufactured by Victrex-MC, Inc.; grade, 150P (380° C., $10^3$ s$^{-1}$, 120 Pa·s)

Liquid crystal polymer (LCP): manufactured by Polyplastics Co., Ltd.; grade, A950 (310° C., $10^3$ s-1, 40 Pa·s)

66 Nylon (PA66): manufactured by BASF, Co., Ltd.; grade, A3 (280° C., $10^3$ s$^{-1}$, 100 Pa·s)

(ii) Filler

Carbon fibers (PAN type): manufactured by Toho Tenax, Inc.; grade, HM35-C6S; fiber diameter, 7 µm; average fiber length, 6 mm; aspect ratio, 857; tensile strength, 3240 MPa Glass fibers: manufactured by Asahi Fiber Glass Co., Ltd.; grade, CS03MA497; fiber diameter, 13 µm; average fiber length, 3 mm; aspect ratio, 230; tensile strength, 3450 MPa Carbon black: manufactured by Mitsubishi Chemical Corporation; grade, #3350B; grain size, 24 nm Alborex: manufactured by Shikoku Chemical Corporation; grade, Y; main component, aluminum borate; average diameter, 0.5 to 1 µm; average fiber length, 10 to 30 µm; aspect ratio, 10 to 60

(A) The creep resistance evaluation method is as follows:
(1) Cup-shaped specimens (ø10 mm (outer diameter)×15 mm (height), side portion thickness: 1 mm, bottom portion thickness: 2 mm) equipped with a pin gate at the center of the lower end surface of the bottom portion and open at the upper end, are injection-molded of the materials of the compositions as shown in FIG. 7, and are used as specimens for extraction force measurement.
(2) A bearing sleeve formed of sintered metal is press-fitted into the inner periphery of the cup-shaped specimen. In this connection, the outer diameter dimension of the bearing sleeve is set such that the press-fitting margin with respect to the cup-shaped specimen is 0.2%. This is put in a constant temperature oven of an atmosphere temperature of 130° C., and left to stand for 5000 hours. These test conditions (130° C., 5000 h) have been set through calculation based on the upper limit of the general atmosphere temperature of use, which is 90° C., and the product service life, which is 10 years. For further approximation to the actual mode, it is also possible to provide an adhesive (e.g., anaerobic adhesive or epoxy type adhesive) in the press-fitting portion. Here, evaluation is made by a method using no adhesive.
(3) The extraction force FO for extraction from the cup-shaped specimen of the bearing sleeve measured directly after the press-fitting of the bearing sleeve, and the extraction force F for extraction from the cup-shaped specimen of the bearing sleeve which has been left to stand for 5000 hours in the constant temperature bath, are measured by a tension and compression tester.

(4) The extraction force reduction ratio of each material is calculated by the following equation, and the creep resistance is evaluated based on the value thus obtained.

Extraction force reduction ratio: $D(\%)=((FO-F)/FO)\times 100$

In the above equation, when the extraction force F after being left to stand is O(N), the extraction force reduction ratio D of the bearing sleeve is 100%. As for a criterion for pass/fail judgment, a specimen with an extraction force reduction ratio D of 90% or less was regarded as acceptable (O), and a specimen with an extraction force reduction ratio of in excess of 90% was regarded as nonconforming (x).

(B) The conductivity of each resin composition is evaluated based on a value obtained through measurement of volume resistivity by the four-point probe method according to JIS K 7194. As for the criterion for pass/fail judgment, a specimen with a volume resistivity of $10^7$ Ω·cm or less was regarded as acceptable (O), and a specimen with a volume resistivity of in excess of $10^7$ Ω·cm was regarded as nonconforming (x).

Figure 8:
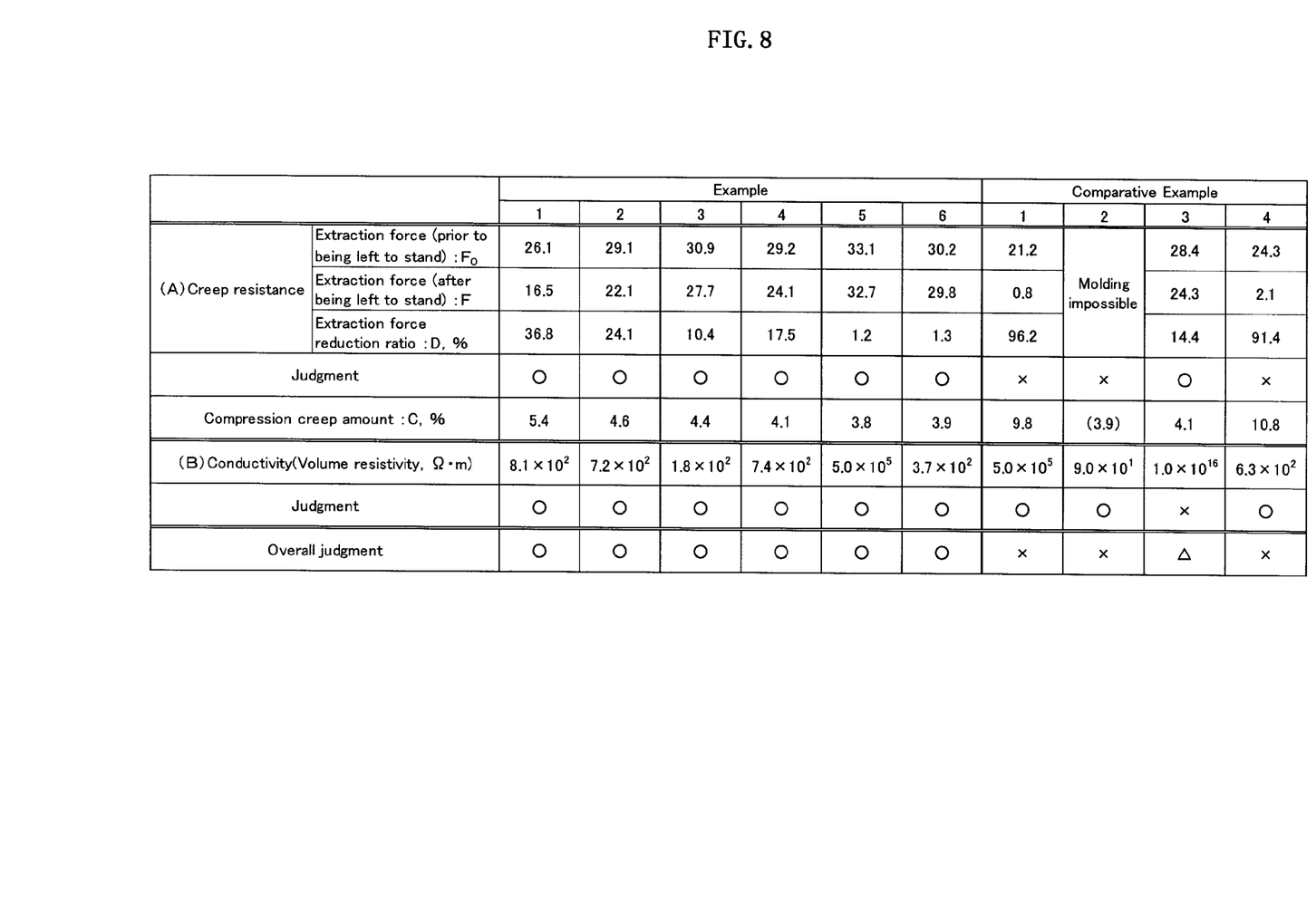
FIG. 8 is a table showing results of tests performed on the examples and comparative examples.

FIG. 8 shows the results of the above test. The resin composition of Comparative Example 2 was regarded as nonconforming in terms of creep resistance since it did not allow molding into a cup shape (housing shape). The resin composition of Comparative Example 3 falls short of the reference value in terms of conductivity, so that it is not suitable as the material for a fluid dynamic bearing device housing for use in an HDD or the like, of which conductivity is required. However, since it can be used in cases where there is no particular need for conductivity, so, all things considered, it was judged to be Δ in evaluation.

By evaluating the resin compositions with the method described above in terms of creep resistance and conductivity, it is possible to make a judgment as to whether or not a resin composition is suitable for use as a material for forming a fluid dynamic bearing device housing. However, the above-described test for evaluation in creep resistance takes a very long time of 5000 hours, so it is actually rather difficult to conduct such a test at the stage of developing a product. In view of this, the compression creep amount of each resin composition is measured, and the relationship between the measurement value and creep resistance is considered, so it is possible to make, in a shorter time, a judgment as to whether or not a resin composition is suitable as a material for forming a fluid dynamic bearing device housing.

The compression creep amount of each of the resin compositions as shown in FIG. 7 was measured by the method described below. The measurement results are shown in FIG. 8.

(1) Injection molding is performed with a material of a composition as shown in FIG. 7 to produce a cylindrical specimen of ø10 mm×20 mm (height) having at its upper end surface a pin gate of a diameter of 2 mm. After the removal of the pin gate, both end surfaces are polished with a #2000 emery paper to prepare a specimen for compression creep measurement.
(2) A thermal inertia of 80° C. is imparted in advance to the set of jigs to be used. The cylindrical specimen is placed on a sufficiently rigid table, more specifically, on a table which only involves a displacement of 2 µm or less even when the measurement load is applied thereto, and an SS disc of 020 mm×10 mm (height) whose both surfaces have been polished to a surface roughness of 0.05 µm is placed on the cylindrical specimen. In this state, a dial gauge capable of measurement to 11100 mm is installed on the table to measure the initial height LO of the cylindrical specimen.

(3) While keeping the atmosphere temperature at 80° C., a load is applied from above the SS disc so that the compressive pressure of the specimen attains a predetermined value (which, in this test, is 80 MPa). In this state, the specimen is left to stand for 168 hours, and then the height L168 of the cylindrical specimen after the application of the load is measured with the dial gauge.

(4) Based on the L0 and L168 thus obtained, the compression creep is obtained from the following equation:

$$\text{Compression creep amount: } C(\%) = 100 \times (L0 - L168)/L0$$

Figure 9:
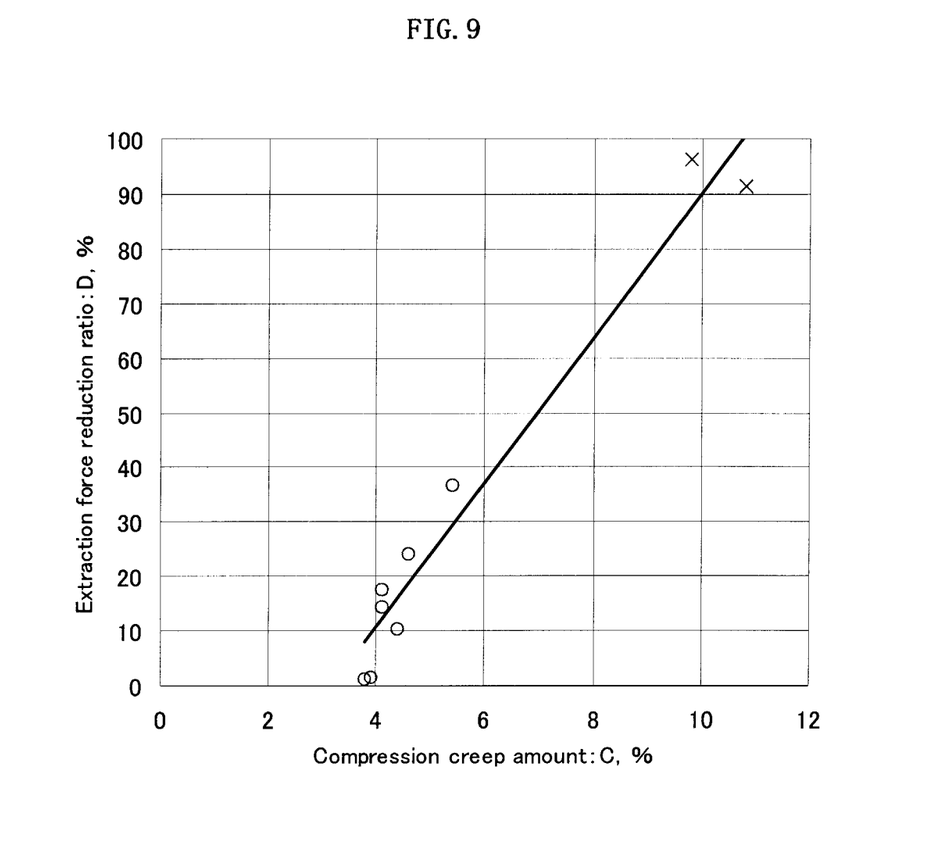
FIG. 9 is a graph showing a relationship between a compression creep amount and an extraction force reduction ratio.

FIG. 9 shows the relationship between the compression creep amount C and the extraction force reduction ratio D. It can be seen from FIG. 9 that the relationship between the compression creep amount C and the extraction force reduction ratio D is substantially of a linear nature. When considered in view of this linearity, an extraction force reduction ratio D of 90% or less can be reliably achieved when the compression creep amount C is 8% or less. Thus, the evaluation of a resin composition in terms of creep resistance, which is required of a resin composition for forming a fluid dynamic bearing housing, can be made by performing measurement to check to see whether or not the compression creep amount is 8% or less under the above conditions (in which a compressive pressure of 80 MPa is applied for 168 hours at an atmosphere temperature of 80° C.)

The invention claimed is:

1. A method for producing a housing for a fluid dynamic bearing device to be fixed to another member with a press-fitting force, the method comprising steps of:

measuring a compression creep amount of a resin composition when a compressive pressure of 80 MPa is applied for 168 hours at an atmosphere temperature of 80° C., obtaining a relationship between the compression creep amount and an extraction force reduction ratio for extraction of the other member, determining a range of the compression creep amount based on the relationship, wherein the range is based on a reduction ratio of 90% or less, and forming at least a portion of the housing, held in contact with the other member with the press-fitting force, of the resin composition exhibiting a value within the range of the compression creep.

2. The method of claim 1, wherein the permissible range of the compression creep amount is 8% or less.

3. A method for producing a housing for a fluid dynamic bearing device to be fixed to another member with a press-fitting force, the method comprising steps of:

measuring a compression creep amount of a resin composition when a compressive pressure of 80 MPa is applied for 168 hours at an atmosphere temperature of 80° C., determining a range of the compression creep amount based on a relationship between the compression creep amount and an extraction force reduction ratio for extraction of the other member, wherein the range is based on a reduction ratio of 90% or less, and forming at least a portion of the housing, held in contact with the other member with the press-fitting force, of the resin composition exhibiting a value within the range of the compression creep.

4. The method of claim 3, wherein the permissible range of the compression creep amount is 8% or less.

5. The method of claim 3, wherein the relationship between the compression creep amount and the extraction force reduction ratio is substantially linear.

* * * * *